Nov. 14, 1950     O. PINTIAUX     2,530,314
CONTACT TOWER FOR CONVERSION UNDER PRESSURE OF
CARBON MONOXIDE AND THE LIKE APPLICATIONS

Filed March 16, 1945     4 Sheets-Sheet 1

INVENTOR.
OSCAR PINTIAUX.
by Haseltine, Lake & Co
ATTORNEYS.

Nov. 14, 1950                    O. PINTIAUX                2,530,314
CONTACT TOWER FOR CONVERSION UNDER PRESSURE OF
CARBON MONOXIDE AND THE LIKE APPLICATIONS
Filed March 16, 1945                                       4 Sheets-Sheet 2
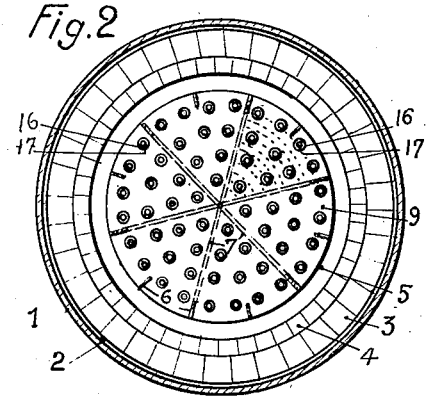
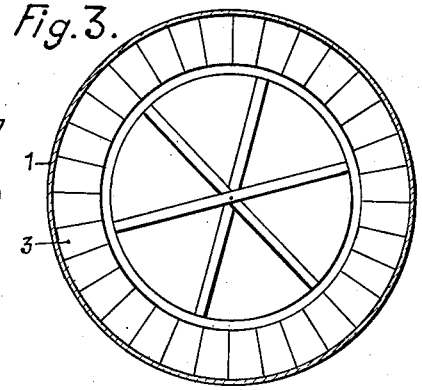
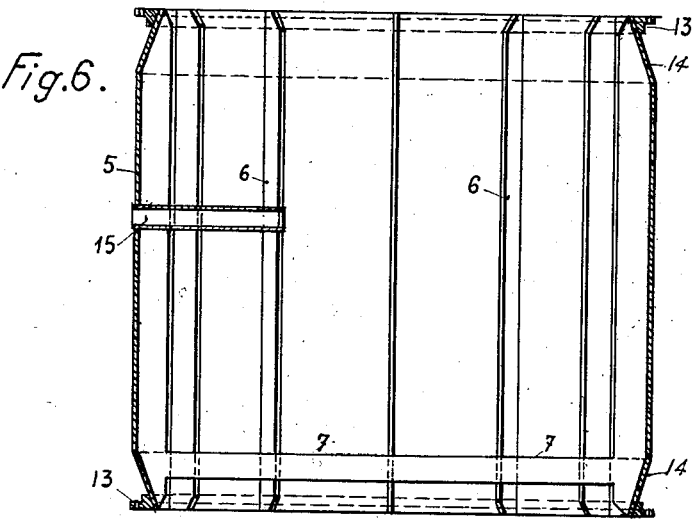
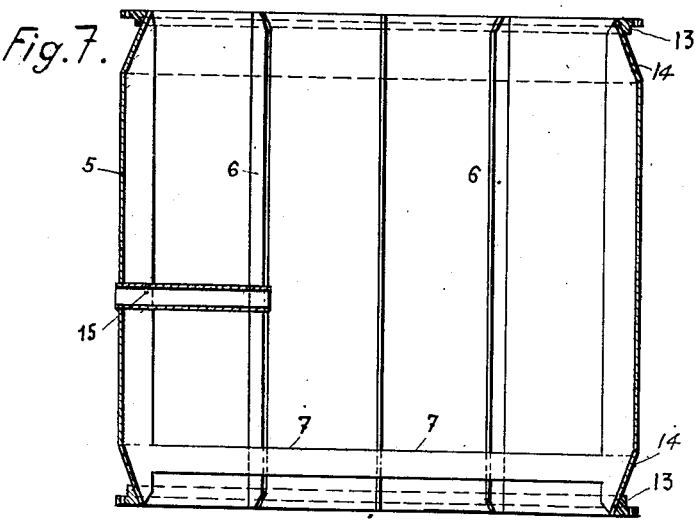
INVENTOR.
OSCAR PINTIAUX.
by Haseltine Lake &Co
ATTORNEYS.

Nov. 14, 1950 O. PINTIAUX 2,530,314
CONTACT TOWER FOR CONVERSION UNDER PRESSURE OF
CARBON MONOXIDE AND THE LIKE APPLICATIONS
Filed March 16, 1945 4 Sheets-Sheet 3

INVENTOR.
OSCAR PINTIAUX.
by Haseltine Lake & Co
ATTORNEYS.

Nov. 14, 1950 — O. PINTIAUX — 2,530,314
CONTACT TOWER FOR CONVERSION UNDER PRESSURE OF
CARBON MONOXIDE AND THE LIKE APPLICATIONS
Filed March 16, 1945 — 4 Sheets-Sheet 4

INVENTOR.
OSCAR PINTIAUX.
by Haseltine, Lake & Co
ATTORNEYS.

Patented Nov. 14, 1950

2,530,314

UNITED STATES PATENT OFFICE 2,530,314

CONTACT TOWER FOR CONVERSION UNDER PRESSURE OF CARBON MONOXIDE AND THE LIKE APPLICATIONS

Oscar Pintiaux, Saint-Laurent Blangy, France, assignor to Societe de Produits Chimiques & Engrais d'Auby, Paris, France Application March 16, 1945, Serial No. 583,122
In France June 9, 1943

Section 1, Public Law 690, August 8, 1946
Patent expires June 9, 1963

5 Claims. (Cl. 23—288)

My invention has for its object improvements in the apparatuses used for the conversion under pressure of carbon monoxide and the like treatments, requiring a contact tower provided with heat exchanging means and wherein a gas under pressure circulates in contact with a catalyser.

Contact towers of this kind which are now in use show, according to their type, different drawbacks from the standpoint of the physicochemical part they are to play, or from the standpoint of the ease of introduction and emptying of the catalyser, which must be operated periodically. In certain of these towers in fact, the catalyser is spread out in a single layer which should be several meters high whereby the catalytic action is exerted therein under unfavourable conditions whereas the emptying of the catalyser constrains the user to lengthy operations.

In other known types of towers, the catalyser is arranged in a plurality of different superposed layers carried by the pressure tube itself or resting on perforated metal sheets, rigid with said tube, the loading and emptying of the catalyser being effected, in this case, through side holes which requires, especially if the tower comprises a tubular bundle operating as an inner heat exchanger, very inconvenient and difficult operations which may lead to a stoppage of the efficient working for a long time.

In certain towers which do not comprise this inner heat exchange, the limitation of the temperature is obtained by means of an atomisation of water, provided for between the catalyser layers, which renders the plant much more intricate.

The present invention has for its object the elimination of these different drawbacks in the working or in the use of such towers.

It covers a contact tower for converting under pressure carbon monoxide or for similar treatments, said tower being chiefly characterized by the fact that it comprises an inner lining or outfit forming a unit which may be dismantled and removed and is constituted by a series of superposed baskets assembled one with another, receiving the catalyser in as many layers and provided with a double heat exchanger, the circulation of the gas over the catalyser being performed from top to bottom through said baskets whereas the loading and emptying of the catalyser may be operated from outside the tower after removal of the lining, i. e. under particularly easy conditions and very quickly.

Other interesting features of this contact tower will appear from the following description of one of its forms of execution, given by way of example and by no means in a limitative manner.

In accompanying drawing

Fig. 1 shows the contact tower to be described hereinafter in diametrical vertical view.

Figs. 2 and 3 correspond to horizontal cross-sections, respectively through planes projected as AB and CD in Fig. 1.

Figs. 6 and 7 are cross-sectional diametrical vertical views of an intermediary basket and of the upper basket respectively.

Figure 1:
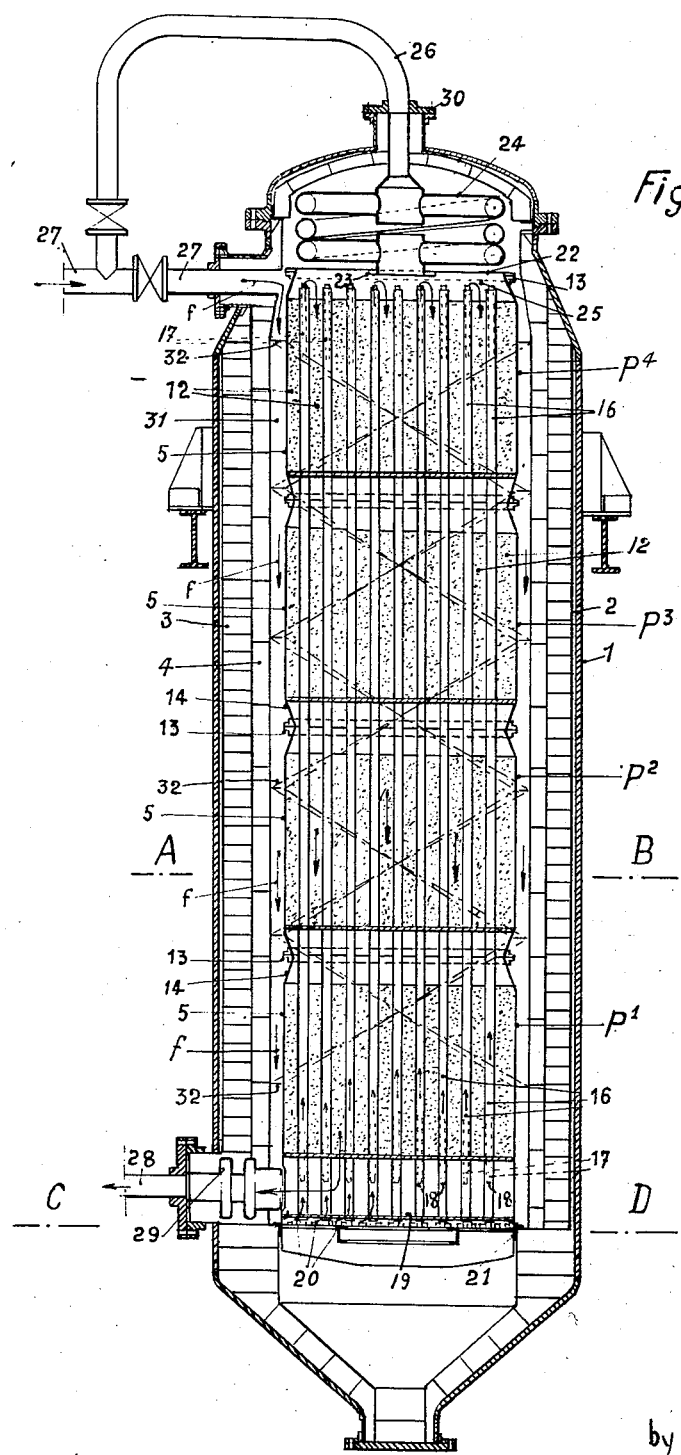
Figure 4:
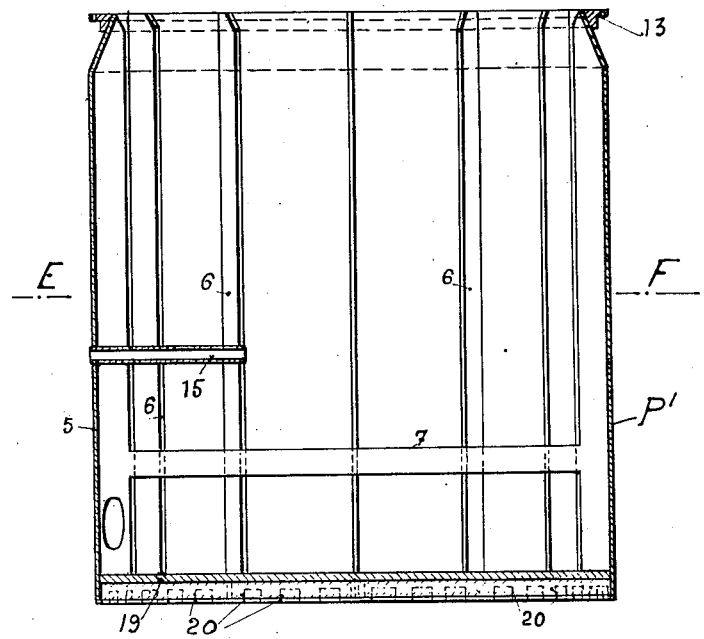
Fig. 4 is a cross-sectional diametrical vertical view of the lower basket of the series.
Figure 5:
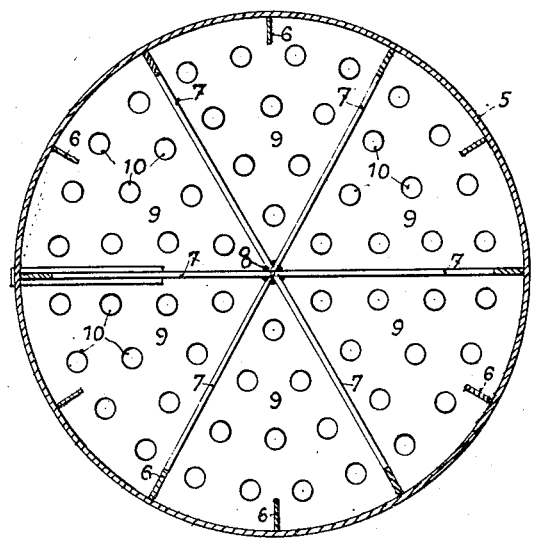
Fig. 5 shows the same in horizontal cross-sectional view through the plane projected as EF in Fig. 4.
Figure 8:
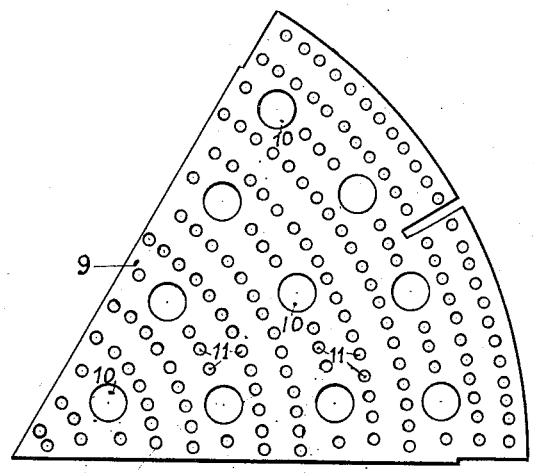
Fig. 8 shows one of the sectors constituting the perforated plates forming the bottoms of the baskets.
Figure 9:
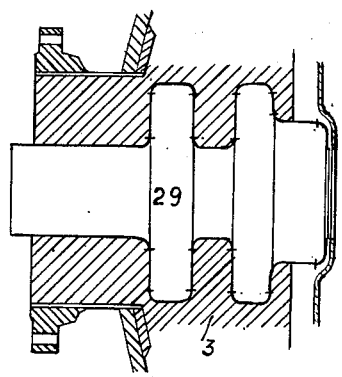
Fig. 9 is also a vertical cross-sectional view of a pipe for expanding the gas at its outlet after conversion.

The tower comprises as well known, an outer metal casing $1$, which is a pressure tube of any suitable constitution and shape, the constitution and shape having no limitative character. The tube is provided in the example shown with a facing or filling of asbestos fibre $2$, which is inserted between said tube and a sheath of diatomite bricks $3$ inside which is built a second sheath of refractory bricks $4$ which forms the inner wall of the tower.

The lining or outfit is constituted in the example shown by a series of four superposed baskets assembled with one another; obviously this number of baskets is given only by way of an indication and is intended for a given plant and it may vary in accordance with the case without widening thereby the scope of the invention.

The baskets have all a similar constitution and differ only through their bulk in height and the location of certain ribs forming supports.

In the example shown, the lining or outfit comprises a lower basket $P^1$, two similar intermediary baskets $P^2$ and $P^3$ and an upper basket $P^4$.

Each basket is constituted by a metallic cylinder $5$ provided with two series of inner ribs which are for instance welded. The ribs of the first series $6$ are vertical and those of the second series $7$ are horizontal and converge at the axis $8$ of the cylinder.

In the example considered, the ribs of the first series are twelve in number and those of the second, six in number, lie in the same vertical planes as the vertical ribs of even (or odd) number.

The horizontal ribs carry in each cylinder sectors 9 the number of which is six in the case illustrated, the assembly of which forms the bottom of the basket and wherein are provided two series of perforations of which the larger 10, serve for the passage of the inner tubular bundle while those of smaller diameter 11, allow the circulation of the gas through the mass of the catalyser 12, which is to fill the baskets when the contact tower is loaded.

Blind tubes 15, used for housing pyrometers, are secured at the desired height on each basket.

The baskets may be assembled by means of flanges 13, each of which is carried by a conical element 14, of the outer wall of one of the cooperating baskets.

The total height of the assembly of these four baskets is of the order of about 6 meters in the example considered, said data being given solely as an indication.

The inner heat exchanger which forms an integral part of the basket unit or outfit and which is removed out of the tower and inserted inside the tower, through the same operations as the basket assembly, is constituted by a bundle of vertical tubes 16, sixty in number in the case illustrated, and the diameter of which is a few centimeters. Inside each heat-exchanging tube is arranged, coaxially, in principle, a second tube 17, closed at its lower end 18 so as to form an annular space which will serve for the circulation of the gases as will be explained hereinafter.

The bundle of these tubes 16 is chucked and welded inside a tube plate 19 secured to the base of the lower basket P¹, said base being moreover provided with notches 20. On the other hand, the upper end of the tubes 16 is free, and nothing prevents their expansion. The blind tubes 17 are hung through their upper end inside the heat exchanging tubes and may also expand freely.

For mounting and setting in place the baskets as well as for the introduction of the catalyser, the lower basket P¹ is arranged vertically, said basket carrying the tubes 16, welded to the tube plate 19. This being done, the first catalyser layer 12, which comprises in the form of execution considered about 2 cubic meters of product, is loaded.

The second basket P² is set in place by fitting it over the upper end of the tubes, after which the two baskets are assembled with their fluid-tight joints through the agency of the flanges 13 and the second catalyser layer is laid inside the basket P². The same operations are repeated for the baskets P³ and P⁴.

This being performed outside the tower, the whole of the basket unit thus assembled, which may weigh about 15 tons is raised by a rolling-bridge or the like and introduced and laid inside the contact tower on a support 21 for the lining while a predetermined angular setting of the basket unit is provided for. Then the upper joint 13 of the upper basket P⁴ is fitted in place. This joint carries through the agency of a disc 22 provided with an axial opening 23, an expansion system comprising a tubular worm affecting the shape of a double pitch screw with two inlets and two outlets diametrically opposed to one another; said worm communicates on one hand with the inner chamber 25 of the filling and on the other with a pipe 26 so as to form a manner of by-pass or shunt between the gas inlet pipe 27 and the inside of the basket column.

The joint of the outlet pipe 28 for the converted gas at the end of another expanding pipe 29 is then fitted in place after which the pyrometers, not shown, are set in the blind holes 15 and the cover 30 is laid over the tower.

The emptying of the catalyser is operated, of course, in a manner reverse to the sequence of operations which has just been described.

During operation, the circuit of the gases is as follows:

In order to make the maximum use of the heat exchanging capacity of the outfit, the gas to be converted and to which the steam necessary for the conversion reaction has been added enters through the lateral pipe 27 and progresses downwards inside the annular space 31 between the basket column and the refractory bricks 4 of the column; the heat exchange due to this first passage of the gases may be still further increased by the presence in this annular space of a double helical slope 32 which constrains the gases to sweep over the entire periphery of the lining or outfit.

The gas, following the path illustrated by the arrows $f$ arrives at the bottom of the tower and passes through the notches or slots 20 into the space underneath the tube plate 19 in which the tubes 16 of the heat-exchanger open. The gas enters these tubes and rises in the annular space between the latter and the blind tubes 17. As it passes out of the upper end of the bundle, it enters in contact with the first layer 12 of the catalyser, passes through the perforations 11 in the bottom of the basket P⁴, enters in contact with the second catalyser layer 12 and so on, the gas circulating downwards through the successive layers of the catalyser until it reaches the basket P¹, from which the converted gas passes out of the apparatus at the lower part of the basket column underneath the fourth catalyser layer through the pipe 28.

For the distribution and adjustment of the temperatures the valve on the by-pass 26 allows the direct passage of all or part of the gas to be converted on to the first catalyser layer without passage through the heat-exchanging tubes 16.

The observation of the temperatures which is performed by means of the four pyrometers arranged to this end provides only comparison means because the ends of the pyrometric rods are submitted to the action not only of the temperature of the catalyser but also to that of the gas to be converted which flows round the lining. However there is no gaseous flow inside the blind tubes 15 which carry the pyrometers, so that the temperatures recorded are not very different from the real temperatures inside the baskets.

The basket outfit may according to the circumstances be built entirely of the alloy known in the trade under the name of Sichromal or else of a steel of the Chromesco grade or again of soft steel of the grade used for boilers and containing the desired contents of carbon.

What I claim is:

1. A contact tower for catalytic treatment, particularly for the pressure conversion of carbon monoxide and similar treatments, comprising a vertical metal casing having an inner refractory lining, a removable gas-tight cap providing a closure to the upper end of said casing, a catalyst carrier arranged inside said casing and comprising a plurality of superposed basket shaped elements having perforated base portions, a first series of open exchange tubes extending from the base of the lowermost element through said perforated bases to the upper portion of the uppermost element, a second series of tubes closed at their lower ends and suspended at their upper ends respectively inside each of said exchange tubes, an annular space between said catalyst carrier and lining, an inlet conduit for gas to be converted opening into the upper part of said annular space, and an outlet conduit for converted gas opening from below the lowermost element.

2. In a contact tower as in claim 1 a bypass comprising means for expanding the gas between said inlet conduit and removable cap and means for regulating the gas admitted through said inlet means.

3. In a contact tower as in claim 1 means for expanding the converted gas in said outlet conduit.

4. In a contact tower as in claim 1 a header plate connected below the lowermost element, the lower ends of the tubes of said first series being connected to said header plate.

5. In a contact tower as in claim 1 a first series of perforations in the base of each said element, each freely surrounding one of said open exchange tubes, and a second series of perforations in the base of each said element, whereby the circulating gas is enabled to pass through a catalyst arranged in said elements.

OSCAR PINTIAUX.

REFERENCES CITED

The following references are of record in the file of this patent:

UNITED STATES PATENTS

| Number | Name | Date |
| --- | --- | --- |
| Re. 19,243 | Richardson | July 7, 1934 |
| 1,761,270 | Miller | June 3, 1930 |
| 1,932,247 | Kniskern | Oct. 24, 1933 |
| 2,280,081 | Prickett et al. | Apr. 21, 1942 |